United States Patent [19]

Jones

[11] Patent Number: 5,116,677
[45] Date of Patent: May 26, 1992

[54] THERMOPLASTIC STRETCH-WRAP MATERIAL

[75] Inventor: Jerry F. Jones, Christiana, Tenn.

[73] Assignee: Co-Ex Plastics, Inc., Lewisburg, Tenn.

[21] Appl. No.: 446,219

[22] Filed: Dec. 5, 1989

Related U.S. Application Data

[63] Continuation-in-part of Ser. No. 139,776, Dec. 30, 1987, Pat. No. 4,923,750.

[51] Int. Cl.$^5$ .................................. B32B 7/12
[52] U.S. Cl. ...................... 428/349; 428/516; 428/520; 428/523; 428/522; 428/903.3; 156/244.11
[58] Field of Search ............ 428/349, 903.3, 516, 428/340, 523, 522; 156/244.11

[56] References Cited

U.S. PATENT DOCUMENTS

| | | | |
|---|---|---|---|
| 2,928,756 | 3/1960 | Campbell . | |
| 3,055,784 | 9/1962 | Roeder . | |
| 3,201,302 | 8/1965 | Williams et al. . | |
| 3,294,577 | 12/1966 | Mayer . | |
| 3,508,944 | 7/1970 | Henderson et al. | 428/913 |
| 3,783,089 | 1/1974 | Hurst et al. . | |
| 3,936,565 | 2/1976 | Good | 428/315 |
| 4,008,352 | 2/1976 | Dawes et al. . | |
| 4,022,646 | 5/1977 | Casey | 156/164 |
| 4,050,221 | 9/1977 | Lancaster et al. . | |
| 4,147,827 | 4/1979 | Breidt et al. | 156/229 |
| 4,151,318 | 4/1979 | Marshall | 428/35 |
| 4,196,240 | 4/1979 | Lustig et al. | 428/35 |
| 4,197,150 | 4/1980 | Breidt et al. | 428/218 |
| 4,205,021 | 5/1980 | Morita et al. | 526/348.2 |
| 4,399,180 | 8/1983 | Brigg et al. | 428/516 |
| 4,418,114 | 11/1983 | Briggs et al. | 428/212 |
| 4,511,609 | 4/1985 | Craver et al. | 428/35 |
| 4,518,654 | 5/1985 | Eichbauer et al. . | |
| 4,647,509 | 3/1987 | Wallace et al. | 428/516 |

FOREIGN PATENT DOCUMENTS

| | | | |
|---|---|---|---|
| 766727 | 9/1967 | Canada . | |
| 914411 | 9/1967 | Canada . | |
| 996018 | 8/1976 | Canada | 428/35 |
| 1168415 | 6/1984 | Canada | 428/516 |
| 1368634 | 9/1971 | United Kingdom . | |
| 1495380 | 11/1976 | United Kingdom . | |

OTHER PUBLICATIONS

Ward, Linear low density polyethylene, Modern Plastics Encyclopedia, 1983-84-p. 60.

*Primary Examiner*—Edith Buffalow
*Attorney, Agent, or Firm*—Marc R. Dion, Sr.

[57] ABSTRACT

An improved co-extruded stretch-wrap film having differential cling properties is provided having a core layer and first and second skin layers. The core layer contains an ethylene copolymer having in polymerized form a major portion of ethylene and a minor portion of an olefin, preferably hexene, the first skin layer contains an ethylene copolymer having in polymerized form a major portion of ethylene and a minor portion of an olefin, preferably butene, and the second skin layer contains a copolymer having in polymerized form a major portion of ethylene and a minor portion of vinyl acetate. The core layer may also contain recycled film of the above description in an amount up to about 20% by weight.

21 Claims, 1 Drawing Sheet

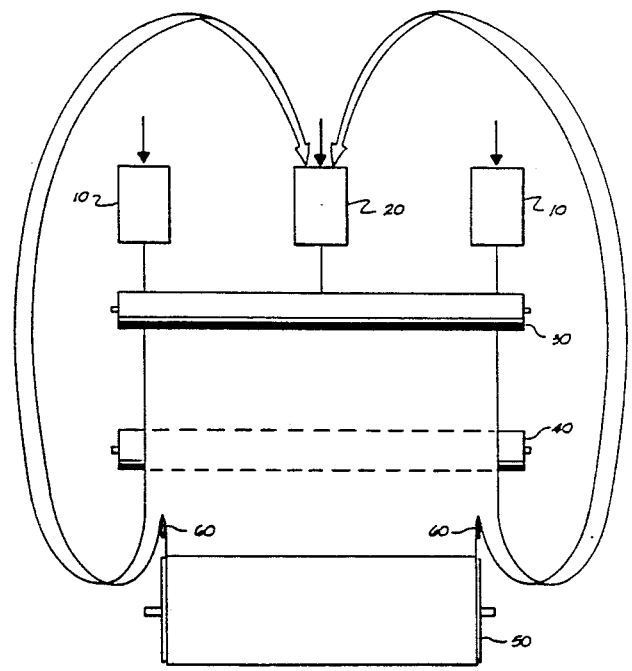

THERMOPLASTIC STRETCH-WRAP MATERIAL

BACKGROUND OF THE INVENTION

The present invention relates to film materials for the utilization in stretch-wrapping techniques in which the film is wrapped about the goods and serves as an exterior covering for same.

Thermoplastic stretch-wrapping materials have found particular commercial use in the overwrapping of goods or pallets of goods. In general, a transparent thermoplastic film is stretched about a pallet containing individual elements or packages of elements during which the pallet of materials is also unitized for ease of handling. Due to the transparent nature of the thermoplastic films involved, the contents of the pallet are visible. Furthermore, by using stretchable thermoplastic film instead of strapping, where the strapping materials are metallic or polymeric, a considerably safer situation is present both in the process of wrapping the materials, while the unitized pallet, etc. is in storage, and very importantly during removal of the film. Particularly, when strapping is utilized to unitize a pallet of goods, or packages of goods, a plurality of straps are passed around a small percentage only of the goods, and are tightened thereabout to secure the goods or packages to the pallet. In order to unitize the pallet with strapping techniques, it is necessary to tension the strapping material to a point where oftentimes certain of the containers are crushed by the strapping force. Moreover, while obviously the strapped packages or goods may be viewed on the pallet, they are also unprotected from the elements and may be damaged or become dirty by exposure to the elements. Upon removal of the tensioned straps from the pallet, there is constantly a danger that upon cutting the tensioned strap, an end of same will strike and injure a nearby individual. Still further, disposal of removed strapping, whether metal or polymeric presents a significant problem.

Conversely, with thermoplastic stretch-wrap materials, where the goods are covered with multiple wraps, the wrapping material totally covers the sides of the goods for the entire height of the pallet or goods and if also wrapped about the pallet in a head to toe operation, totally encapsulates the goods thereon. Since the wrapping material conforms itself to the outer edges and extremities of the packages or goods, the wrapping film must be resistant to tear and burst for successful use. Moreover, with a pallet so wrapped, even in the event of a tear or puncture of the wrap film, the force of the packaging is distributed over the height of the pallet as opposed to being concentrated as with a single band of strapping material such that there is no danger of the material becoming a possible lethal projectile in the event of rupture.

Stretch-wrapping materials have been heretofore utilized successfully in the wrapping of goods or pallets of materials where either the goods or the pallet are rotated past a wrapping station with the film maintained under appropriate stretch or tension conditions, or where a film holder is moved about the goods or pallet, again with the film under stretch or tensioned conditions as appropriate for the particular arrangement. The wrap may be either flat or spiral, depending upon the width of the packaging material, the size of the pallet and the like, and once wrapping is complete, an end of the film may be appropriately secured to a prior film wrap layer or layers by tape, adhesives, cling character of the film or the like.

In general, stretch films employed in the prior art have included films manufactured from polyethylene, polyvinyl chloride, ethylene vinyl acetate and various copolymers in both single and multiple layer films.

As alluded to in part above, physical characteristics of stretch-wrap films are highly important in the overall success of use of the film. Particularly important properties include the resistance of the film to puncture, such as might be occasioned by the film wrapping around a sharp or protruding edge or corner of a product where a high amount of pressure may be involved over a relatively small surface. Likewise, other important physical properties of wrap films include elongation, clarity, toughness and resistance to tear, melt index, density, haze, and cling. For example, if during use, a rip or tear occurs along an edge of a film and extends inwardly therefrom, it is highly important that the film resist enlargement of the tear or rip across the entire width of same.

One example of a prior art thermoplastic stretch-wrap film is set forth in Briggs et al. U.S. Pat. No. 4,399,180. Briggs et al. disclose a three-layer thermoplastic film in which the three layers are co-extruded and in which a core or inner layer, includes ethylene copolymerized with a minor amount of at least one alpha-olefin having 4 to 10 carbon atoms and two exterior or skin layers which include highly branched low density polyethylene.

Another example of a prior art stretch-wrap film is a co-extruded three-layer film in which the core layer is ethylene copolymerized with octene, and the skin layers are ethylene copolymerized with 1-butene. While the just-mentioned stretch-film has enjoyed commercial success, certain homogeneity problems have been experienced with same as will be alluded to hereinafter which led to the possibility of weak spots in the film.

As noted above, it is known in the art to provide film having a cling character such that an overlapping layer of the film clings to underlying wrap layers avoiding the need of tape or adhesives. However, cling wrap films have led to problems in the transportation and handling or goods or parcels wrapped therewith. Adjacent wrapped parcels tend to stick together because of the high coefficient of friction between the two parcels caused by the cling characteristic of the wrap film. The tendency is for one parcel to pull destructively upon the adjacent parcel breaking the film or pulling over stacks of parcels. This problem was addressed by Eichbauer et al. in U.S. Pat. No. 4,518,654. Eichbauer et al. disclose a one-sided cling stretch wrap having an A/B structure wherein layer A in stretched condition has a comparatively high cling force to layer B and layer B has at least substantially no cling force to a layer of itself, and in fact, layer B is said to have a slide property when in contact with a layer of itself. Generally, the film of Eichbauer et al. is achieved by dispersing a cling additive in layer A and an anticling additive in layer B.

Another example of a prior art thermoplastic composite stretch wrap film having differential cling properties is set forth in U.S. Pat. No. 4,436,788 to Cooper. Cooper discloses a layered film prepared by the coextrusion of a first composition containing at least 90% by weight ethylene/vinyl acetate (EVA) with a tackifier added thereto and a second composition containing at least 90% by weight linear low density polyethylene (LLDPE). Optionally, a third layer of at least 90% by weight EVA is lamellarly adhered to the LLPDE layer producing a three layer EVA/LLDPE/EVA structure.

Other prior art examples of films having specific cling properties include British Patent No. 1,578,063 to Huke which discloses a polyethylene/polyisobutylene film treated on one side with a corona discharge to increase cling on that side and Japanese Patent No. 3012-971 to Honshu which discloses a polypropylene composite film with antiblocking agents such as silica added thereto to decrease cling.

In the commercial production of co-extruded thermoplastic wrap films, once the basic film product has been produced and is in the process of being wound into roll form, the film is normally trimmed along each outer edge if the film width is to be that being extruded. Alternately, the film can be slit at desired widths with different rolls of films of the same or different width being simultaneously formed as the film is being produced. In either case, waste film is produced.

In a conventional commercial situation, it is highly desirable if not necessary from an economic standpoint, to recycle the just described waste film as opposed to discarding same. The waste film can be collected, chopped up and reintroduced to one of the extruders wherefore it is reused in the production of the thermoplastic stretch-wrap film. Obviously, however, the scrap film includes all of the various layers, whereby different polymers are present. When the different polymers are reintroduced to the extruder, normally into the core layer extruder, the core layer then ceases to be pure and, in fact, becomes a hybrid with the ultimate composition of same being determined by the amount of scrap or recycled material added to the extruder along with the virgin material. It is this recycling of scrap material that is believed to have created homogeneity problems with the film defined above. Particularly, with an ethylene-octene core layer and ethylene-butene skin layers, the ethylene-butene components of the recycled material may become incompatible or nonhomogeneous, with the ethylene-octene core material leading to the possibility of imperfections or weak spots in the ultimate co-extruded film.

The film of the present invention affords a technically improved stretch wrap material having differential cling with quite good physical properties while not possessing the homogeneity problems noted above. The stretch wrap film of the present invention thus represents an improvement over prior art films for such purpose and is neither taught nor suggested thereby. Exemplary of additional prior art are Buggs et al. U.S. Pat. No. 4,418,114; Weiner U.S. Pat. No. 4,297,411; Waiver et al. U.S. Pat. No. 4,125,662; and Mientus et al. U.S. Pat. No. 4,588,650.

SUMMARY OF THE INVENTION

It is an object of the present invention to provide an improved thermoplastic stretch-wrap film.

It is another object of the present invention to provide a stretch wrap film having differing cling properties on its opposite sides.

Still another object of the present invention is to provide an improved thermoplastic stretch-wrap film that is a co-extruded multi-layer film.

Yet still another object of the present invention is to provide an improved cast co-extruded thermoplastic stretch-wrap film.

It is yet another object of the present invention to provide a multi-layer stretch wrap film having differing cling properties on its opposite sides which may be recycled during production.

Generally speaking, in one preferred embodiment, the co-extruded composite stretch-wrap film according to the present invention includes a first layer which may be a core layer and a second layer which may be an outer skin layer, said core layer comprising a copolymer having in polymerized form, a major portion of ethylene and a minor portion of an alpha olefinic monomer and said second or skin layer comprising an ethylene-vinyl acetate copolymer containing from about 15 to about 25 weight percent vinyl acetate in which the ethylene-vinyl acetate has a different cling property than the first or core layer.

More particularly, in a most preferred embodiment, the stretch film according to the present invention comprises a core layer containing in polymerized form a major portion of ethylene and a minor portion of an alpha olefin with a skin layer on opposite sides of same, a first skin layer including in polymerized form a major amount of ethylene and a minor amount of an alpha olefin having no more than three carbon atoms difference than the olefinic monomer included in the core copolymer, and a second skin layer that is a copolymer of ethylene and vinyl acetate in which the vinyl acetate content is from about 15 to about 25 weight percent, and in which the skin layers have different cling properties.

Exemplary of a most preferred form of the co-extruded composite stretch-wrap film of the present invention is a core layer of a copolymer of ethylene and hexene with an outer skin layer on one side of the core layer in which the copolymer includes ethylene and 1-butene and the ethylene vinyl acetate copolymer on the opposite side of the core.

In the true commercial composite, however, where the film produced is trimmed and/or slit and waste or scrap product is generated, it is economically significant that the scrap composite film be recycled. The scrap film, of course itself is a composite of skin and core layers as identified above, and when recycled to the core layer extrusion apparatus, changes the composition of the core layer. It has particularly been determined that in such a hybrid layer in which diversity of minor components noted above are included, no homogeneity problems arise.

In fact, it has been surprisingly determined that when utilizing copolymers of ethylene and alpha olefins in which the minor components of the skin layer and core layer or layers number three carbon atoms different or less, and where the amount of recycled material is 20% or less, the homogeneity problems experienced with the prior art are absent. Consequently, whereas the ethylene-butene copolymer of the skin layer is preferred as exhibiting excellent characteristics for stretch-wrap applications, the minor component of the core layer copolymer should be selected from a group consisting of pentene, hexene and septene, while the percentage recycled film to the core layer is 20% or less based on a film in which the core layer is present in a range of from about 70 to 50 weight percent with two outer skin layers being present in a range from about 15 to 25 weight percent each.

A preferred form of the stretch-wrap film of the present invention as noted above provides for differential cling properties. When, as above, the core layer is a copolymer having in polymerized form a major portion of ethylene and a minor portion of an olefinic monomer, the first skin layer is a copolymer having in polymerized form a major portion of ethylene and a minor portion of an olefinic monomer numbering three carbon atoms or less difference than the olefinic monomer of the core and, the opposite skin layer is an ethylene/vinyl acetate (EVA) copolymer with from about 15% to 25% by weight of vinyl acetate, no homogeneity problems result when waste film is recycled as set forth herein.

Recyclability is maintained by restricting the EVA skin layer to no greater than 15% by weight of the entire film with 10% by weight being preferred. Preferably, for this embodiment, the core is maintained at from about 50% to 70% by weight of the film with 60% being optimum, the first skin layer ranges from about 25% to 35% by weight of the film with 30% being optimum and the second skin layer ranges from about 8% to about 15% by weight. As above, no more than 20% of the film is trimmed and recycled into the core layer with only about 12% to 15% by weight preferably being recycled. Thus, the total vinyl acetate level is kept sufficiently low to avoid the homogeneity problems of the prior art upon incorporation of the second skin layer into the core.

The co-extruded product of the present invention exhibits excellent physical properties for stretch-wrap applications as alluded to hereinafter.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

The FIGURE is a schematic illustration of a process for producing co-extruded composite stretch-wrap films according to the present invention.

DESCRIPTION OF PREFERRED EMBODIMENTS

Significant emphasis has been placed in recent years on the use of composite thermoplastic films that are either cast or blown for use in packaging, particularly in packaging applications where the film is stretch wrapped about the products or plural units of products on conventional shipping pallets. For acceptable commercial application such films must possess significant stretch characteristics to insure, particularly in pallet or similar wrapping operations, the production of a tightly unitized unit, while at the same time not damaging the product or products being wrapped. Since many products being so wrapped are of non-uniform shape, and/or possess pointed or like edges, it is highly significant that the wrapping film exhibit resistance to puncture and even if punctured, resistance to tear. Hence, should a rip, tear or puncture occur in the film, it is important that the imperfection not continue across the full width of the film.

Also, with such stretch wrap films it is preferable that the film possess cling properties such that the wrapped goods are securely bound thereby without the need of tensioned straps or tapes and adhesives. With uniform cling films, however, it is generally known that a film that will adhere to a layer of itself, will also adhere to a similar layer wrapped about an adjacent parcel leading to significant problems in shipping and handling. Thus, it is advantageous to provide a film having differential cling properties, that is, a cling side and a non-cling side. For proper results, the cling side must securely adhere to the non-cling side, but two adjacent non-cling sides must not adhere to each other. Hence, parcels wrapped with such film are bound thereby as the overlapping cling side adheres to an underlying non-cling side, while exterior non-cling film sides on adjacent parcels do not adhere to each other. Further, and of considerable significance, since in most instances with the use of stretch-wrap film the entire parcel is encapsulated, clarity of the film is important in permitting visual observation of the products contained within the wrap.

Films according to the present invention are cast co-extruded films which preferably contain three layers and exhibit all or some of the needed physical characteristics as described above.

Referring to the FIGURE, it may be seen that three extruders 10, 10 and 20 are employed. Extruders 10 are utilized for outer skin film layers and extruder 20 is utilized for a core layer residing between the outer skin layers. Virgin copolymer resin according to predetermined formulations is fed to the individual extruders where the resin is appropriately heated, masticated and extruded according to conventional techniques. The resin extrudate from the three extruders is then cast into a composite layered film at primary chill roll 30 as mentioned above containing two outer skin layers and a core layer.

The cast composite film is then appropriately further processed, again according to conventional techniques by being subjected to a secondary chill roll 40 and the like after which the produced film is taken up in roll form at take-up roll 50.

The thickness of the produced film varies according to the ultimate application of same and as would be expected, a feathering or thinning of the composite film thickness occurs along outer opposite extremities of the film sheet. To avoid inconsistencies in thickness or millage of the film, the outer feathered film edges are trimmed away from the film sheet by slitting knives, schematically illustrated as 60. The remaining trimmed film sheet can then be collected in roll form at full width, or as a series of rolls of various or same width films.

In accordance with one embodiment of the present invention, one skin layer (non-cling) of the composite film includes a linear low density copolymer of ethylene as a major component and an alpha olefin as a minor component where the olefinic hydrocarbon contains from 4 to 10 carbon atoms and most preferably is butene-1. The olefinic monomer is present in a range of from about 5 to about 15 weight percent and preferably from about 7 to about 12 weight percent, and most preferably about 10 weight percent. The opposite skin layer (cling) is a copolymer of low density ethylene and vinyl acetate containing from about 15 to about 25 weight percent vinyl acetate. The core layer of the film according to the present invention is a linear low density copolymer containing ethylene as a major component and an olefinic hydrocarbon as a minor ingredient, and where the olefinic hydrocarbon is determined by the olefinic hydrocarbon utilized in the skin layer and has no more than three carbon atoms different than the number of carbon atoms in the olefinic hydrocarbon component of the skin layer. The olefinic component of the core copolymer is present in a range of from about one to about 5 weight percent and preferably from about 2 to about 4 weight percent, and most preferably about 3 weight percent. In a most preferred composition, the skin layer is a copolymer of linear low density ethylene and 1-butene, while the core layer is a copolymer of a linear low density ethylene and hexene. Both the skin and core layers may include minor amounts of other ingredients.

Further important characteristics of the components of the film are melt index and density. Particularly, the copolymer utilized for the non-cling skin layer should have a melt index of from about 1.5 to about 2.5 and preferably from 1.8 to about 2.2 with a density in a range of from about 0.91 to about 0.92 and most preferably from about 0.916 to about 0.920..Copolymers suitable for use as a core layer of the present invention should have a melt index of from about 0.5 to about 1.5 and preferably from about 0.8 to about 1.2, and a density of from about 0.91 to about 0.92, and most preferably from about 0.916 to about 0.920. For the cling layer, the copolymer melt index should range from about 1.0 to 2.2 and preferably from about 1.4 to about 1.8 with density in a range of from about 0.91 to about 0.96, and most preferably about 0.93 to about 0.95.

More specifically as to the embodiment noted above, the core layer and one skin layer are analogous to that set forth in copending application Ser. No. 07/139,776 now U.S. Pat. No. 4,923,750. Generally, the core layer is an ethylene polymer having in polymerized form a major portion of ethylene and a minor portion of an olefinic monomer. Likewise the first skin layer is an ethylene polymer having in polymerized form a major portion of ethylene and a minor portion of an olefinic monomer. However, in the present embodiment which provides a stretch-wrap film having differential cling properties, the second skin layer is a polymer having in polymerized form a major portion of ethylene and a minor portion of vinyl acetate. It has been found that such ethylene/vinyl acetate (EVA) copolymer provides excellent cling properties. In accordance with the present invention, recyclability is maintained by keeping the vinyl acetate concentration in the film at a minimum. Thus, the second layer is preferably no more than 15% by weight of the film and the vinyl acetate is preferably no more than 25% by weight of the second layer. Additionally, as above, non-homogeneity problems are avoided by maintaining the number of carbon atoms of the olefinic monomers of the core and the first skin layer within three carbon atoms of each other. Thus, in a most preferred embodiment, the core layer is preferably a copolymer of ethylene and hexene, and the first skin layer is preferably a copolymer of ethylene and butene, and as above, improved characteristics are found when the core and first skin layer are linear low density polyethylenes as opposed to highly branched low density polyethylenes.

Thus, it is preferred that the one-sided cling wrap embodiment of the present invention comprises from about 50% to about 70% by weight of a core layer, the core layer being a polymer having in polymerized form a major portion of ethylene and a minor portion of an olefinic monomer, from about 25% to about 35% by weight of a first skin layer, the first skin layer being a polymer having in polymerized form a major portion of ethylene and a minor portion of an olefinic monomer, and from about 8% to about 15% by weight of a second skin layer, the second skin layer being a polymer having in polymerized form a major portion of ethylene and a minor portion of vinyl acetate. Most preferably, the core layer is about 60% by weight of the film, the first skin layer is about 30% by weight of the film and the second skin layer is about 10% by weight of the film. The second skin layer may contain from about 15% to about 25% by weight of vinyl acetate although the amount is preferably within the range of from about 17% to about 20% by weight with 18% by weight of vinyl acetate providing optimum cling and recyclability properties. The first skin layer preferably further includes from about 850 to 1000 parts per million of an antiblock agent in order to avoid the clinging of adjacent wrapped goods discussed above. Silicas, such as diatomaceous earth, provide good antiblock characteristics. However, other antiblock additives such as talc and the like are also within the scope of the present invention.

Additionally, in producing the present one-sided cling film, it is necessary to have the side of the film on which the first skin layer (ethylene/olefin copolymer) is carried contact the primary chill roll 30 rather than having that side which carries the second skin layer (EVA) contacting the roll. It has been found that contacting the second skin layer with the primary chill roll causes the vinyl acetate therein to fuse through the film resulting in a two-sided, rather than a one-sided, cling.

The present invention will be better understood by reference to the following examples, with Example 2 directed to the differential cling wrap film of the present invention.

EXAMPLE 1

A composite co-extruded stretch-wrap film was produced on commercial Black Clawson cast film apparatus with two skin layers at about 20 weight percent and about a 60 weight percent core layer. The skin layers were produced from Exxon Chemical Co.'s LL-1002.15, a low linear density copolymer of ethylene and 1-butene having a melt index of 2.0 and a density of 0.918, and containing about 10 weight percent butene. The core layer was produced from Exxon's LL-3001, a low linear density copolymer of ethylene and hexene having a melt index of 1.0 and a density of 0.918 and containing about 3 weight percent hexene. The core and skin polymers were co-extruded into a composite, three layer film which was subjected to calendering and chilling after which the cast film sheet was trimmed and taken up on a roll. The trimmed composite film as identified above was recycled to the core layer extruder at a level of about 12 weight percent based on total film weight. The produced film had a thickness of 0.90 mil. Film produced as aforesaid was tested according to standard ASTM tests noted below and exhibited the characteristics set forth in Table I, and was compared to a commercial stretch-wrap film.

TABLE I

| Physical Characteristics of Composite Three Layer Stretch-Wrap Film | | | | |
|---|---|---|---|---|
| Film Properties | | ASTM Method | Present Invention | Commercial Film |
| Gauge (mil) Avg | | — | 0.89 | 0.86 |
| Hi | | — | 0.95 | |
| Low | | — | 0.80 | |
| Tensile @ Break, (psi) | MD* | D882 | 8875 | 5675 |
| | TD* | D882 | 5325 | 3600 |

TABLE I-continued

Physical Characteristics of Composite Three Layer Stretch-Wrap Film

| Film Properties | | ASTM Method | Present Invention | Commercial Film |
|---|---|---|---|---|
| Elongation @ Break, % | MD | D882 | 550 | 550 |
| | TD | D882 | 800 | 800 |
| Secant Modulus, (Kpsi) | MD | D882 | 19.2 | 17.8 |
| | TD | D882 | 20.6 | 18.7 |
| Elmendorf Tear (g/mil) | MD | D1992 | 125 | 120 |
| | TD | D1992 | 550 | 730 |
| Dart Impact (g/mil) | | D1709 | 130 | 60 |
| Tensile @ Yield, (psi) | MD | D882 | 1125 | 1175 |
| | TD | D882 | 1125 | 1125 |
| Elongation Yield, % | MD | | 9 | 12 |
| | TD | | 10 | 12 |
| Roll Hardness (RHOS) | | | 28 | 35 |
| Cling, (gms) | 0% | | 100 | 360 |
| | 100% | | 100 | 310 |
| | 200% | | 90 | 250 |
| MD Tensile, psi @ | 200% | | 1690 | 1950 |

*MD = machine direction; TD = transverse or across machine direction

As can be seen from Table I, the film according to the present invention exhibited good tensile and elongation, was a soft cast film, was easy to stretch, and exhibited good cling for a non-tactified film. The present film also compared quite favorably with the commercial film which is a tactified co-extruded three layer film.

EXAMPLE 2

A composite co-extruded one-side cling film was produced on commercial Black Clawson cast film apparatus with a first skin layer at about 30 weight percent, a second skin layer at about 10 weight percent and about 60 weight percent core layer. The first skin layer was produced from Exxon Chemical Company's LL-1002.37, a linear low density copolymer of ethylene and a 1-butene having a melt index of 2.0 and a density of 0.918, and containing about 10 weight percent butene. Added to the copolymer for the first skin layer was 900 parts per million of Ampacet Chemical Company's 10063, a polyethylene antiblock of diatomaceous earth. The second skin layer was produced from Exxon Chemical Company's ESCORENE LD-720.62, a copolymer of ethylene and vinyl acetate having a melt index of 1.6 and a density of 0.943, and containing about 19 weight percent vinyl acetate. The core layer was produced from HS 702BNT7 produced by Union Carbide Corporation, a low density copolymer of ethylene and hexene having a melt index of 1.0 and a density of 0.918 and containing about 3 weight percent hexene. The core and skin layers were co-extruded into a composite, three-layer film which was subjected to calendering and chilling with the first skin layer contacting the primary chilling roll. The cast film sheet was then trimmed and taken up on a roll. The trimmed composite film was recycled to the core layer extruder at a level of about 12 weight percent based on total film weight. The produced film had a thickness of 0.80 mil. Film produced as aforesaid was tested according to standard ASTM tests noted below and exhibited the characteristics set forth in Table II.

TABLE II

| Film Properties | ASTM Method | Present Invention |
|---|---|---|
| Gauge (mil) Avg | — | 0.80 |
| Hi | — | 0.90 |
| Low | — | 0.70 |

TABLE II-continued

| Film Properties | | ASTM Method | Present Invention |
|---|---|---|---|
| Tensile @ Break, (psi) | MD* | D882 | 8300 |
| | TD* | D882 | 5600 |
| Elongation @ Break, % | MD | D882 | 480 |
| | TD | D882 | 780 |
| Secant Modulus, (Kpsi) | MD | D882 | 20.0 |
| | TD | D882 | 20.0 |
| Elmendorf Tear (g/mil) | MD | D1992 | 260 |
| | TD | D1992 | 740 |
| Dart Impact (g/mil) | | D1709 | 240 |
| Tensile @ Yield, (psi) | MD | D882 | 1150 |
| | TD | D882 | 1160 |
| Elongation Yield, % | MD | | 8 |
| | TD | | 9 |
| Roll Hardness (RHOS) | | | 28 |
| Cling, (gms) | 0% | | 100 |
| | 100% | | 150 |
| | 200% | | 110 |
| MD Tensile, psi @ | 200% | | 1960 |
| Coefficient of Friction (non-cling side) | | D1894 | 1.0 |

EXAMPLE 3

Example 2 was repeated with the exception that the second skin layer was produced from a copolymer of ethylene and vinyl acetate containing about 28 weight percent vinyl acetate. The three-layer film produced demonstrated an excessively high cling and was found to be unmanageable in use.

It will be understood, of course, that while the form of the invention herein shown and described constitutes a preferred embodiment of the invention, it is not intended to illustrate all form of the invention. It will also be understood that the words used are words of description rather than of limitation and that various changes may be made without departing from the spirit and scope of the invention herein disclosed.

What is claimed is:

1. An improved coextruded stretch wrap film comprising a core and two skin layers thereon, said core comprising an ethylene polymer having in polymerized form a major portion of ethylene and a minor portion of an olefinic monomer, the first of said two skin layers comprising an ethylene polymer having in polymerized form a major portion of ethylene and a minor portion of an olefinic monomer, the second of said two skin layers comprising a polymer having in polymerized form a major portion of ethylene and a minor portion of vinyl acetate.

2. A film as defined in claim 1 wherein the core is a copolymer of ethylene and hexene.

3. A film as defined in claim 1 wherein the first skin layer is a copolymer of ethylene and butene.

4. A film as defined in claim 1 wherein the second skin layer comprises from about 15% to about 25% by weight vinyl acetate.

5. A film as defined in claim 1 wherein the second skin layer comprises from about 17% to about 20% by weight vinyl acetate.

6. A film as defined in claim 5 wherein the second skin layer comprises about 18% by weight vinyl acetate.

7. A film as defined in claim 1 wherein said core further comprises up to about 20% by weight of recycled film, said recycled film comprising a core layer of an ethylene polymer having in polymerized form a major portion of ethylene and a minor portion of an olefinic monomer, a first skin layer of an ethylene polymer having in polymerized form a major portion of ethylene and a minor portion of an olefinic monomer, said olefinic monomer used in said first skin layer containing no more than three carbon atoms different than said olefinic monomer used in said core, and a second skin layer of an ethylene polymer having in polymerized form a major portion of ethylene and minor portion of vinyl acetate, said vinyl acetate comprising from about 15% to about 25% by weight of said second skin layer.

8. A film as defined in claim 7 wherein said core comprises from about 12% to about 15% by weight of said recycled film.

9. An improved coextruded stretch-wrap one-sided cling film comprising:
   about 50% to about 70% by weight of a core layer, said core layer comprising a polymer having in polymerized form a major portion of ethylene and a minor portion of an olefinic monomer;
   about 25% to about 35% by weight of a first skin layer, said first skin layer comprising a polymer having in polymerized form a major portion of ethylene and a minor portion of an olefinic monomer; and
   about 8% to about 15% by weight of a second skin layer, said second skin layer comprising a polymer having in polymerized form a major portion of ethylene and minor portion of vinyl acetate.

10. A film as in claim 9 wherein said core layer is about 60% by weight of said film, said first skin layer is about 30% by weight of said film and said second skin layer is about 10% by weight of said film.

11. A film as defined in claim 9 wherein said second skin layer comprises from about 15% to about 25% by weight of vinyl acetate.

12. A film as defined in claim 11 wherein said second skin layer comprises from about 17% to about 20% by weight of vinyl acetate.

13. A film as defined in claim 12 wherein said second skin layer comprises about 18% by weight of vinyl acetate.

14. A film as defined in claim 9 wherein said first skin layer further comprises from about 850 to about 1000 parts per million of an antiblock agent.

15. A film as defined in claim 14 wherein said antiblock agent is a silica.

16. An improved coextruded recyclable stretch-wrap film comprising:
   from about 50% to about 70% by weight of a core layer comprising a linear low density polyethylene copolymerized with hexene;
   from about 25% to about 35% by weight of a first skin layer comprising a linear low density polyethylene copolymerized with butene; and
   from about 8% to about 15% by weight of a second skin layer comprising an ethylene polymer having from about 15% to about 25% by weight vinyl acetate polymerized therewith.

17. A film as defined in claim 16 wherein said ethylene polymer of said second skin layer has from about 17% to about 20% by weight vinyl acetate polymerized therewith.

18. A film as defined in claim 17 wherein said ethylene polymer of said second skin layer has about 18% by weight vinyl acetate polymerized therewith.

19. A film as defined in claim 16 wherein said core layer is about 60% by weight of said film, said first skin layer is about 30% by weight of said film and said second skin layer is about 10% by weight of said film.

20. An improved coextruded stretch wrap film, comprising:
   a core and two skin layers thereon, said core comprising a linear low density copolymer of ethylene as a major component and an olefinic hydrocarbon as a minor component, the first of said two skin layers comprising a linear low density copolymer of ethylene as a major component and an olefinic hydrocarbon as a minor component, the second of said two skin layers comprising a copolymer of low density ethylene and vinyl acetate.

21. A method for producing a stretch wrap film, comprising:
   co-extruding into a composite film a core and two skin layers on opposite sides of said core, said core comprising an ethylene polymer having in polymerized form a major portion of ethylene and a minor portion of an olefinic monomer, the first of said skin layers comprising an ethylene polymer having in polymerized form a major portion of ethylene and a minor portion of an olefinic monomer, the second of said skin layers comprising an ethylene polymer having in polymerized form a major portion of ethylene and a minor portion of a vinyl acetate;
   calendering said composite film; and
   contacting said first skin layer of said composite film with a chill roll to chill the composite; and
   taking up said film.

* * * * *